United States Patent
Park et al.

(10) Patent No.: US 11,011,938 B2
(45) Date of Patent: *May 18, 2021

(54) MAGNETIC FIELD ADJUSTING THREE-DIMENSIONAL FLEXIBLE RESONATOR FOR WIRELESS POWER TRANSMISSION SYSTEM

(71) Applicant: Samsung Electronics Co., Ltd., Gyeonggi-do (KR)

(72) Inventors: Jae Hyun Park, Gyeonggi-do (KR); Young Ho Ryu, Gyeonggi-do (KR); Sang Wook Kwon, Gyeonggi-do (KR); Ki Young Kim, Gyeonggi-do (KR); Yun Kwon Park, Gyeonggi-do (KR); Keum Su Song, Seoul (KR); Chi Hyung Ahn, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/790,251

(22) Filed: Feb. 13, 2020

(65) Prior Publication Data
US 2020/0185970 A1 Jun. 11, 2020

Related U.S. Application Data

(63) Continuation of application No. 14/438,076, which is a continuation of application No. (Continued)

(30) Foreign Application Priority Data

Oct. 23, 2012 (KR) ........................ 10-2012-0117646

(51) Int. Cl.
*H02J 50/12* (2016.01)
*H01P 7/00* (2006.01)
*H01P 7/10* (2006.01)

(52) U.S. Cl.
CPC ................ *H02J 50/12* (2016.02); *H01P 7/00* (2013.01); *H01P 7/10* (2013.01)

(58) Field of Classification Search
CPC ..... H02J 3/36; H02J 5/00; H02J 5/005; H01P 7/00; H01P 7/10; H01P 7/105
See application file for complete search history.

(56) References Cited

U.S. PATENT DOCUMENTS

| 4,053,856 A | 10/1977 | Fisher et al. |
| 9,275,622 B2 | 3/2016 | Claeys |

(Continued)

FOREIGN PATENT DOCUMENTS

| JP | 2006-222582 | 8/2006 |
| KR | 1020050009101 | 1/2005 |

(Continued)

OTHER PUBLICATIONS

Korean Office Action dated Mar. 5, 2019 issued in counterpart application No. 10-2012-0117646, 8 pages.

(Continued)

*Primary Examiner* — Diana J. Cheng
(74) *Attorney, Agent, or Firm* — The Farrell Law Firm, P.C.

(57) ABSTRACT

A wireless power transmitter for wirelessly transmitting power is provided. The wireless power transmitter includes four cells configured to wirelessly transmit power to a wireless power receiver; a power source configured to provide power to one of the four cells; and a connection unit configured to connect the four cells to each other, wherein the connection unit is further configured to connect the four cells in a cross configuration.

2 Claims, 22 Drawing Sheets

Related U.S. Application Data

PCT/KR2013/009403, filed on Oct. 22, 2013, now Pat. No. 10,594,161.

(56) References Cited

U.S. PATENT DOCUMENTS

| | | |
|---|---|---|
| 2010/0007445 A1 | 1/2010 | Ishizaki et al. |
| 2010/0097163 A1 | 4/2010 | Shin et al. |
| 2011/0018360 A1 | 1/2011 | Baarman et al. |
| 2011/0241437 A1 | 10/2011 | Kanno |
| 2012/0049643 A1 | 3/2012 | Ryu et al. |
| 2012/0193997 A1 | 8/2012 | Hong et al. |
| 2016/0233556 A1 | 8/2016 | Nakamura |

FOREIGN PATENT DOCUMENTS

| | | |
|---|---|---|
| KR | 1020110004322 | 1/2011 |
| KR | 1020120051033 | 5/2012 |
| KR | 1020130058423 | 6/2013 |

OTHER PUBLICATIONS

European Search Report dated Mar. 24, 2016 issued in counterpart application No. 13848491.0-1874, 10 pages.
PCT/ISA/210 Search Report dated Jan. 28, 2014 issued on PCT/KR2013/009403 (pp. 2).
PCT/ISA/237 Written Opinion dated Jan. 28, 2014 issued on PCT/KR2013/009403 (pp. 5).
Korean Office Action dated Oct. 8, 2018 issued in counterpart application No. 10-2012-0117646, 7 pages.

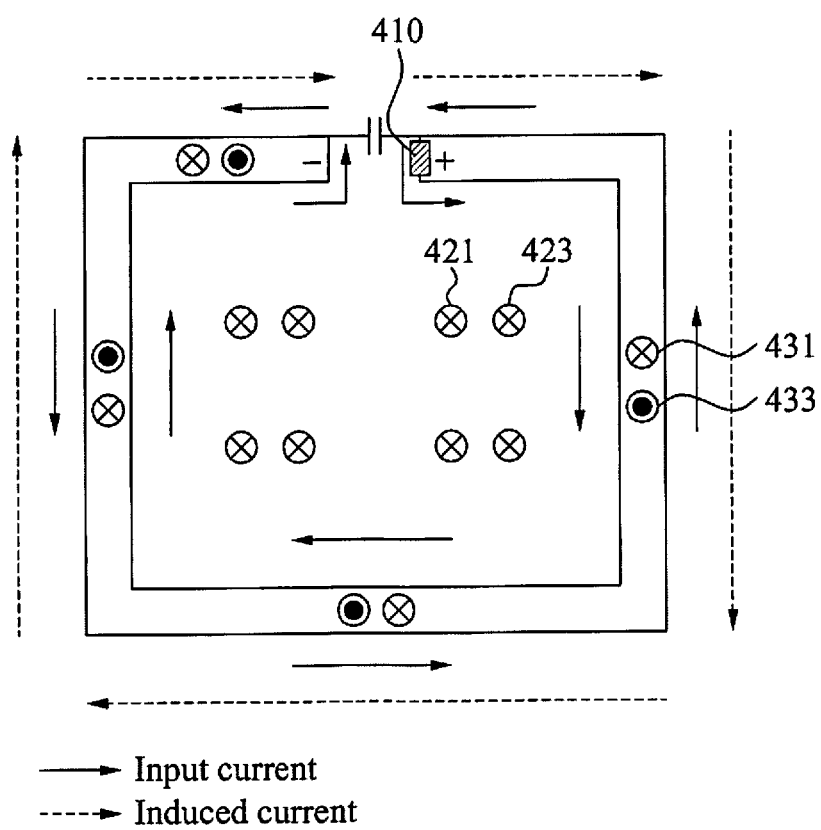

1010

MAGNETIC FIELD ADJUSTING THREE-DIMENSIONAL FLEXIBLE RESONATOR FOR WIRELESS POWER TRANSMISSION SYSTEM

PRIORITY

This continuation application claims priority under 35 U.S.C. § 120 to U.S. patent application Ser. No. 14/438,076, filed on Apr. 23, 2015 in the United States Patent and Trademark Office, which is a National Phase Entry of PCT International Application No. PCT/KR2013/009403, which was filed on Oct. 22, 2013, and claimed priority under 35 U.S.C. § 119(a) to Korean Patent Application Serial No. 10-2012-0117646, which was filed on Oct. 23, 2012 in the Korean Intellectual Property Office, the contents of each of which are incorporated herein by reference.

BACKGROUND

1. Field of the Invention

The present invention relates generally to a wireless power transmission system, and more particularly, to a stereoscopic flexible stereoscopic resonator.

2. Description of the Related Art

Wireless power refers to energy that is transmitted from a wireless power transmission apparatus to a wireless power reception apparatus via magnetic coupling. Accordingly, a wireless power charging system includes a source device configured to wirelessly transmit power, and a target device configured to wirelessly receive power. The source device may be referred to as a wireless power transmission apparatus, and the target device may be referred to as a wireless power reception apparatus.

The source device may include a source resonator, and the target device may include a target resonator. Magnetic coupling or resonant coupling may be formed between the source resonator and the target resonator.

SUMMARY

The present invention has been made to address the above-mentioned problems and disadvantages, and to provide at least the advantages described below. Accordingly, an aspect of the present invention provides a stereoscopic flexible resonator that includes at least one cell, at least one resonator including a capacitor, and a connection unit to connect the cell and the resonator in a stereoscopic structure.

In accordance with an aspect of the present invention, a wireless power transmitter for wirelessly transmitting power is provided. The wireless power transmitter includes four cells configured to wirelessly transmit power to a wireless power receiver; a power source configured to provide power to one of the four cells; and a connection unit configured to connect the four cells to each other, wherein the connection unit is further configured to connect the four cells in a cross configuration.

BRIEF DESCRIPTION OF DRAWINGS

The foregoing and other aspects, features, and advantages of the present invention will be more apparent from the following description, taken in conjunction with the accompanying drawings, in which:

FIGS. 4A and 4B illustrate a distribution of a magnetic field within a resonator based on feeding of a feeder according to an embodiment of the present invention;

DETAILED DESCRIPTION OF EMBODIMENTS OF THE PRESENT INVENTION

Figure 1:
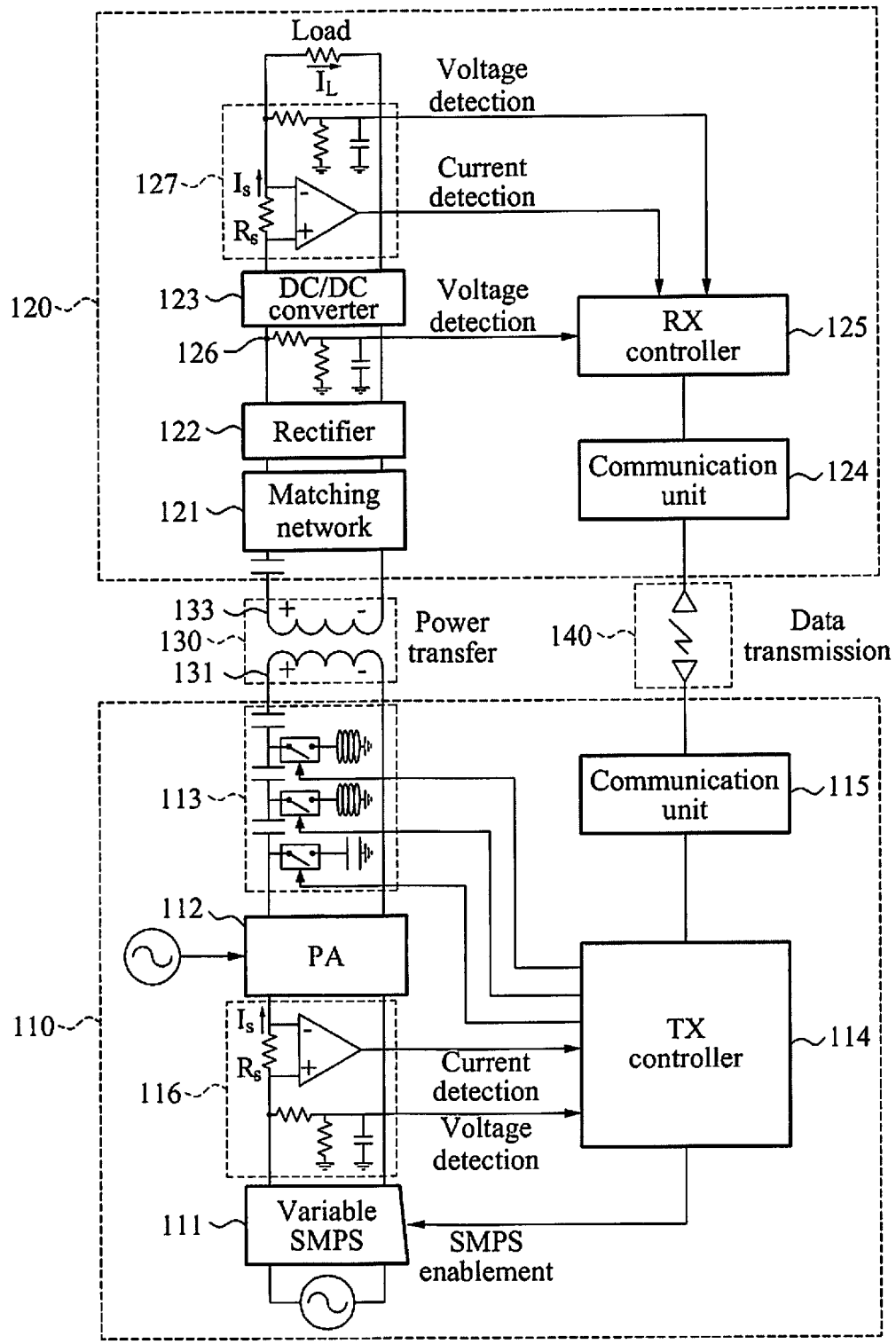
FIG. 1 illustrates a wireless power transmission system according to an embodiment of the present invention.

Recently, various portable electronic products have been released, along with the development of Information Technologies (IT). Such an environment has led to a surge in a quantity of terminals that are possessed and carried by each individual. Accordingly, as portable electronic products are diversified and made more complex, power charging of devices has emerged as an issue. In home appliances, as well as portable devices, data may be transmitted wirelessly, however, power lines are required at all times due to power.

A wireless power transmission technology enabling a power supply without using a power line has been increasingly highlighted. For example, when wireless power transmission technology is commercialized, energy may be easily supplied to a wired charging system that is currently used. Wireless power transmission may enable power charging at any time and anywhere, and may realize an environment enabling the sharing of a power source between devices even without a power source. Additionally, the wireless power transmission may prevent the pollution of nature and the environment by used batteries.

When wireless power transmission is applied to Consumer Electronics (CE) devices (for example, mobile phones, cameras, and the like), mobile devices, and medical devices (for example, hearing aids, medical sensors, and the like), a first priority may be to enhance power transmission efficiency. Typically, power transmission efficiency may quickly change due to a change in a location or an angle of a device. Accordingly, a user may need to be informed of a sudden change in power transmission efficiency, and may experience inconvenience of having to place the device in a predetermined location.

Therefore, a resonator that may transmit optimum power and maintain power transmission efficiency, despite a change in location or angle of a wireless charging device based on user convenience and an enhancement in power transmission efficiency is required. The above technology is also applicable to wireless charging and a transmission system used in medical devices as well as CE devices.

In a resonator according to an embodiment of the present invention, power transmission efficiency is maintained, and optimum power is transmitted to a mobile device, a medical device, and the like in a wireless charging and transmission system, despite a change in a location or an angle of a device based on user convenience.

Hereinafter, embodiments of the present invention are further described below with reference to the accompanying drawings.

A scheme of communicating between a source and a target may include an in-band communication scheme and an out-of-band communication scheme. In the in-band communication scheme, the source and the target communicate with each other using the same frequency band that is used for power transmission. In the out-of-band communication scheme, the source and the target communicate with each other using a frequency band that is different from a frequency band that is used for power transmission.

FIG. 1 illustrates an example of a wireless power transmission system according to an embodiment of the present invention.

Referring to FIG. 1, the wireless power transmission system includes a source 110 and a target 120. The source 110 refers to a device configured to supply wireless power, and includes all electronic devices capable of supplying power, for example a pad, a terminal, a television (TV), and the like. The target 120 refers to a device configured to receive supplied wireless power, and includes all electronic devices requiring power, for example a terminal, a TV, a vehicle, a washing machine, a radio, an electric light, and the like.

The source 110 includes a variable Switching Mode Power Supply (SMPS) 111, a Power Amplifier (PA) 112, a matching network 113, a transmission (TX) controller 114 (for example, a TX control logic), a communication unit 115, and a power detector 116.

The variable SMPS 111 generates Direct Current (DC) voltage by switching Alternating Current (AC) voltage in a band of tens of Hertz (Hz) output from a power supply. The variable SMPS 111 outputs DC voltage of a predetermined level, or may adjust an output level of DC voltage based on the control of the TX controller 114.

The power detector 116 detects output current and output voltage of the variable SMPS 111, and transfers, to the TX controller 114, information on the detected current and the detected voltage. Additionally, the power detector 116 detects input current and input voltage of the PA 112.

The PA 112 generates power by converting DC voltage of a predetermined level to AC voltage, using a switching pulse signal in a band of a few megahertz (MHz) to is tens of MHz. Accordingly, the PA 112 converts DC voltage supplied to the PA 112 to AC voltage, using a reference resonant frequency $F_{Ref}$, and generates communication power used for communication, or charging power used for charging. The communication power and the charging power may be used in a plurality of target devices.

The communication power refers to low power of 0.1 milliwatt (mW) to 1 mW.

The charging power refers to high power of 1 mW to 200 W that is consumed in a device load of a target device. In an embodiment of the present invention described herein, the term "charging" may be used to refer to supplying power to a unit or element that is configured to charge power. Additionally, the term "charging" may be used to refer to supplying power to a unit or element that is configured to consume power.

The units or elements may include, for example, batteries, displays, sound output circuits, main processors, and various sensors.

Also, the term "reference resonant frequency" refers to a resonant frequency that is used by the source 110. Additionally, the term "tracking frequency" refers to a resonant frequency that is adjusted by a preset scheme.

The TX controller 114 detects a reflected wave of the communication power or the charging power, and detects mismatching that occurs between a target resonator 133 and a source resonator 131 based on the detected reflected wave. To detect mismatching, for example, the TX controller 114 detects an envelope of the reflected wave, a power amount of the reflected wave, and the like.

The matching network 113 compensates for impedance mismatching between the source resonator 131 and the target resonator 133 to achieve optimal matching, under the control of the TX controller 114. The matching network 113 is connected through a switch, based on a combination of a capacitor and an inductor, under the control of the TX controller 114.

The TX controller 114 calculates a Voltage Standing Wave Ratio (VSWR), based on a voltage level of the reflected wave, and based on a level of an output voltage of the source resonator 131 or the PA 112. For example, when the VSWR is greater than a predetermined value, the TX controller 114 determines that mismatching is detected.

In another example, when the VSWR is less than the predetermined value, the TX controller 114 calculates a power transmission efficiency for each of N tracking frequencies, determines a tracking frequency $F_{Best}$ with the best power transmission efficiency among the N tracking frequencies, and adjusts the reference resonant frequency $F_{Ref}$ to the tracking frequency $F_{Best}$. In various examples, the N tracking frequencies may be set in advance.

The TX controller 114 adjusts a frequency of a switching pulse signal. Under the control of the TX controller 114, the frequency of the switching pulse signal is determined. For example, by controlling the PA 112, the TX controller 114 generates a modulation signal to be transmitted to the target 120. In other words, the communication unit 115 transmits a variety of data 140 to the target 120 using in-band communication. The TX controller 114 detects a reflected wave, and demodulates a signal received from the target 120 through an envelope of the detected reflected wave.

The TX controller 114 generates a modulation signal for in-band communication, using various methods. For example, the TX controller 114 generates the modulation signal by turning on or off a switching pulse signal, by performing delta-sigma modulation, and the like. Additionally, the TX controller 114 generates a Pulse-Width Modulation (PWM) signal with a predetermined envelope.

The communication unit 115 performs out-of-band communication that employs a communication channel. The communication unit 115 includes a communication module, such as one configured to process ZigBee, Bluetooth, and the like. The communication unit 115 transmits the data 140 to the target 120 through the out-of-band communication.

The source resonator 131 transfers an electromagnetic energy 130 to the target resonator 133. For example, the source resonator 131 transfers the communication power or charging power to the target 120, using magnetic coupling with the target resonator 133.

The target 120 includes a matching network 121, a rectifier 122, a DC-to-DC (DC/DC) converter 123, a communication unit 124, a reception (RX) controller 125 (for example, an RX control logic), and a power detector 127.

The target resonator 133 receives the electromagnetic energy 130 from the source resonator 131. For example, the target resonator 133 receives the communication power or charging power from the source 110, using the magnetic coupling with the source resonator 131. Additionally, the target resonator 133 receives the data 140 from the source 110 using in-band communication.

The matching network 121 matches an input impedance viewed from the source 110 to an output impedance viewed from a load. The matching network 121 is configured with a combination of a capacitor and an inductor.

The rectifier 122 generates DC voltage by rectifying an AC voltage. For example, the rectifier 122 rectifies AC voltage received from the target resonator 133.

The DC/DC converter 123 adjusts a level of the DC voltage that is output from the rectifier 122, based on a capacity required by the load. For example, the DC/DC converter 123 adjusts the level of the DC voltage output from the rectifier 122 from 3 volts (V) to 10 V.

The power detector 127 detects voltage at an input 126 of the DC/DC converter 123, and detects current and voltage at an output of the DC/DC converter 123. The detected voltage at the input 126 is used to calculate a transmission efficiency of power received from the source 110. Additionally, the detected current and the detected voltage at the output is used by the RX controller 125 to calculate an amount of power transferred to the load. The TX controller 114 of the source 110 determines an amount of power that must be transmitted by the source 110, based on power required by the load and power transferred to the load. When power of the output calculated using the communication unit 124 is transferred to the source 110 comprising the RX controller 125, the source 110 calculates an amount of power that must be transmitted.

The communication unit 124 performs in-band communication for transmitting or receiving data using a resonance frequency. During in-band communication, the RX controller 125 demodulates a received signal by detecting a signal between the target resonator 133 and the rectifier 122, or detecting an output signal of the rectifier 122. For example, the RX controller 125 demodulates a message received using in-band communication. Additionally, the RX controller 125 adjusts an impedance of the target resonator 133 using the matching network 121 to modulate a signal transmitted to the source 110. For example, the RX controller 125 increases the impedance of the target resonator 133, so that a reflected wave may be detected from the TX controller 114 of the source 110. Depending on whether the reflected wave is detected, the TX controller 114 may detect a binary number, for example a "0" or a "1."

The communication unit 124 transmits a response message to the communication unit 115 of the source 110. For example, the response message may include at least one of a type of a corresponding target, information about a manufacturer of a corresponding target, a model name of a corresponding target, a battery type of a corresponding target, a scheme of charging a corresponding target, an impedance value of a load of a corresponding target, information on characteristics of a target resonator of a corresponding target, information on a frequency band used by a corresponding target, an amount of a power consumed by a corresponding target, an IDentifier (ID) of a corresponding target, and information on version or standard of a corresponding target. A type of information included in the response message may be changed based on implementation.

The communication unit 124 performs out-of-band communication using a communication channel. For example, the communication unit 124 includes a communication module, such as one configured to process ZigBee, Bluetooth, and the like. The communication unit 124 transmits or receives the data 140 to or from the source 110 using out-of-band communication.

The communication unit 124 receives a wake-up request message from the source 110, and the power detector 127 detects an amount of power received by the target resonator 133. The communication unit 124 transmits, to the source 110, information on the detected amount of power. Information on the detected amount of power includes, for example, an input voltage value and an input current value of the rectifier 122, an output voltage value and an output current value of the rectifier 122, an output voltage value and an output current value of the DC/DC converter 123, and the like.

In FIG. 1, the TX controller 114 sets a resonance bandwidth of the source resonator 131. Based on a setting of the resonance bandwidth of the source resonator 131, a Quality factor or Q-factor of the source resonator 131 is determined. Additionally, the RX controller 125 sets a resonance bandwidth of the target resonator 133. Based on a setting of the resonance bandwidth of the target resonator 133, a Q-factor of the target resonator 133 is determined. For example, the resonance bandwidth of the source resonator 131 may be set to be greater than or less than the resonance bandwidth of the target resonator 133.

The source 110 and the target 120 communicate with each other in order to share information about the resonance bandwidth of the source resonator 131 and the resonance bandwidth of the target resonator 133. In an example in which power desired or required by the target device 120 is greater than a reference value, the Q-factor of the source resonator 131 is set to a value greater than "100." In another example in which the power desired or required by the target 120 is less than the reference value, the Q-factor of the source resonator 131 is set to a value less than "100."

In wireless power transmission employing a resonance scheme, resonance bandwidth is an important factor. A Q-factor considers a change in a distance between the source resonator 131 and the target resonator 133, a change in the resonance impedance, impedance mismatching, a reflected signal, and the like, and is represented by Qt. In this example, Qt has an inverse-proportional relationship with resonance bandwidth, as indicated in Equation (1) below.

$$\frac{\Delta f}{f_0} = \frac{1}{Qt} \qquad (1)$$
$$= \Gamma_{S,D} + \frac{1}{BW_S} + \frac{1}{BW_D}$$

In Equation (1) above, $f_0$, denotes a central frequency, $\Delta f$ denotes a change in a bandwidth, $\Gamma_{S,D}$ denotes a reflection loss between the source resonator 131 and the target resonator 133, $BW_S$ denotes the resonance bandwidth of the source resonator 131, and $BW_D$ denotes the resonance bandwidth of the target resonator 133.

An efficiency U of the wireless power transmission is defined as indicated in Equation (2) below.

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_\kappa} \quad (2)$$

In Equation (2) above, $\kappa$ denotes a coupling coefficient of energy coupling between the source resonator 131 and the target resonator 133, $\Gamma_S$ denotes a reflection coefficient in the source resonator 131, $\Gamma_D$ denotes a reflection coefficient in the target resonator 133, $\omega_0$ denotes a resonant frequency, M denotes a mutual inductance between the source resonator 131 and the target resonator 133, $R_S$ denotes an impedance of the source resonator 131, $R_D$ denotes an impedance of the target resonator 133, $Q_S$ denotes a Q-factor of the source resonator 131, $Q_D$ denotes a Q-factor of the target resonator 133, and $Q_K$ denotes a Q-factor of the energy coupling between the source resonator 131 and the target resonator 133.

Referring to Equation (2) above, the Q-factors has high relevance to the efficiency of the wireless power transmission.

Accordingly, to increase the efficiency of wireless power transmission, the Q-factors are set to high values. For example, when the Q-factors $Q_S$ and $Q_D$ are set to extremely high values, the efficiency of the wireless power transmission is reduced due to a change in the coupling coefficient $\kappa$, a change in the distance between the source resonator 131 and the target resonator 133, a change in the resonance impedance, impedance mismatching, and the like.

Additionally, to increase the efficiency of wireless power transmission, when the resonance bandwidth of the source resonator 131, and the resonance bandwidth of the target resonator 133 are set to be excessively narrow, impedance mismatching and the like occurs due to even a small external effect. Considering impedance mismatching, Equation 1 is represented as indicated in Equation (3) below.

$$\frac{\Delta f}{f_0} = \frac{\sqrt{VSWR} - 1}{Qt\sqrt{VSWR}} \quad (3)$$

In FIG. 1, the source 110 wirelessly transmits wake-up power used to wake up the target 120, and broadcasts a configuration signal used to configure a wireless power transmission network. The source 110 receives, from the target 120, a search frame including a value of receiving sensitivity of the configuration signal, permits interaction with the target 120, and transmits, to the target 120, an ID used to identify the target 120 in the wireless power transmission network. Additionally, the source 110 generates charging power through power control, and wirelessly transmits the charging power to the target 120.

Additionally, the target 120 receives wake-up power from at least one of a plurality of source devices, and activates a communication function using the wake-up power. The target 120 receives a configuration signal used to configure a wireless power transmission network of each of the plurality of source devices, selects the source 110 based on receiving sensitivity of the configuration signal, and wirelessly receives power from the selected source 110.

In the following description, the term "resonator" used to describe FIGS. 2 through 4 refers to both a source resonator and a target resonator.

Figure 2A:
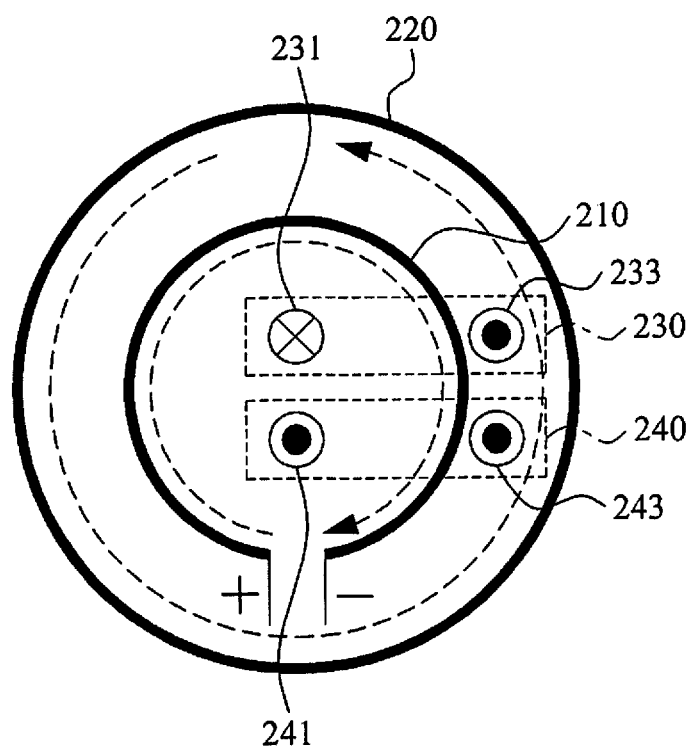
FIGS. 2A and 2B illustrate a distribution of a magnetic field in a feeder and a resonator according to an embodiment of the present invention.
Figure 2B:
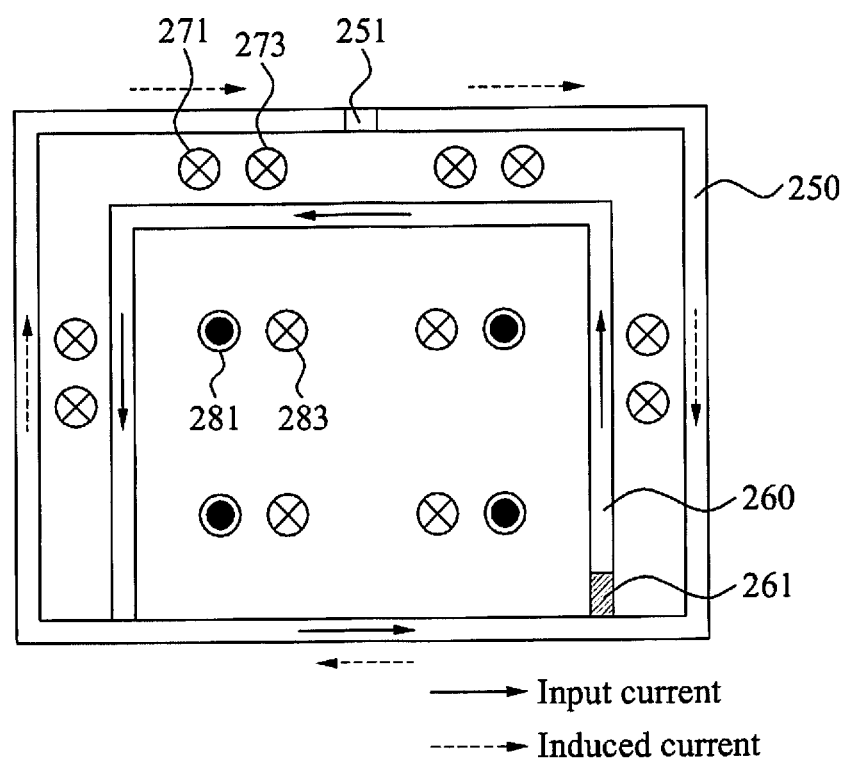

FIGS. 2A and 2B illustrate examples of a distribution of a magnetic field in a feeder and a resonator according to an embodiment of the present invention.

When a resonator receives power supplied through a separate feeder, magnetic fields are formed in both the feeder and the resonator.

Referring to FIG. 2A, as input current flows into a feeder 210, a magnetic field 230 is formed. A direction 231 of the magnetic field 230 within the feeder 210 has a phase that is opposite to a phase of a direction 233 of the magnetic field 230 outside the feeder 210. The magnetic field 230 formed by the feeder 210 causes induced current to be formed in a resonator 220. The direction of the induced current is opposite to a direction of the input current.

Due to the induced current, a magnetic field 240 is formed in the resonator 220. Directions of a magnetic field formed due to induced current in all positions of the resonator 220 may be the same. Accordingly, a direction 241 of the magnetic field 240 formed by the resonator 220 may have the same phase as a direction 243 of the magnetic field 240 formed by the resonator 220.

Consequently, when the magnetic field 230 formed by the feeder 210 and the magnetic field 240 formed by the resonator 220 are combined, strength of the total magnetic field may decrease within the feeder 210, however, the strength may increase outside the feeder 210. In an example in which power is supplied to the resonator 220 through the feeder 210 configured as illustrated in FIG. 2A, the strength of the total magnetic field may decrease in the center of the resonator 220, but may increase outside the resonator 220. In another example in which a magnetic field is randomly distributed in the resonator 220, it may be difficult to perform impedance matching, since an input impedance may frequently vary. Additionally, when the strength of the total magnetic field is increased, an efficiency of wireless power transmission may be increased. Conversely, when the strength of the total magnetic field is decreased, the efficiency for wireless power transmission may be reduced. Accordingly, the power transmission efficiency may be reduced on average.

FIG. 2B illustrates an example of a structure of a wireless power transmission apparatus in which a source resonator 250 and a feeder 260 have a common ground. The source resonator 250 includes a capacitor 251. The feeder 260 receives an input of a Radio Frequency (RF) signal via a port 261. For example, when the RF signal is input to the feeder 260, input current is generated in the feeder 260. The input current flowing in the feeder 260 causes a magnetic field to be formed, and a current is induced in the source resonator 250 by the magnetic field. Additionally, another magnetic field is formed due to the induced current flowing in the source resonator 250. In this example, a direction of the input current flowing in the feeder 260 has a phase opposite to a phase of a direction of the induced current flowing in the source resonator 250. Accordingly, in a region between the source resonator 250 and the feeder 260, a direction 271 of the magnetic field formed due to the input current has the same phase as a direction 273 of the magnetic field formed due to the induced current, and thus the strength of the total magnetic field increases. Conversely, within the feeder 260, a direction 281 of the magnetic field formed due to the input current may have a phase opposite to a phase of a direction 283 of the magnetic field formed due to the induced current, and thus the strength of the total magnetic field decreases. Therefore, the strength of the total magnetic field decreases in the center of the source resonator 250 but increases outside the source resonator 250.

The feeder 260 determines an input impedance by adjusting an internal area of the feeder 260. The input impedance refers to an impedance viewed in a direction from the feeder 260 to the source resonator 250. When the internal area of the feeder 260 is increased, the input impedance is increased. Conversely, when the internal area of the feeder 260 is reduced, the input impedance is reduced. Because the magnetic field is randomly distributed in the source resonator 250 despite a reduction in the input impedance, a value of the input impedance varies based on a location of a target device. Accordingly, a separate matching network is required to match the input impedance to an output impedance of a PA. For example, when the input impedance is increased, a separate matching network is used to match the increased input impedance to a relatively low output impedance.

In an example in which a target resonator has the same configuration as the source resonator 250, and when a feeder of the target resonator has the same configuration as the feeder 260, a separate matching network is required, because a direction of current flowing in the target resonator has a phase opposite to a phase of a direction of induced current flowing in the feeder of the target resonator.

Figure 3A:
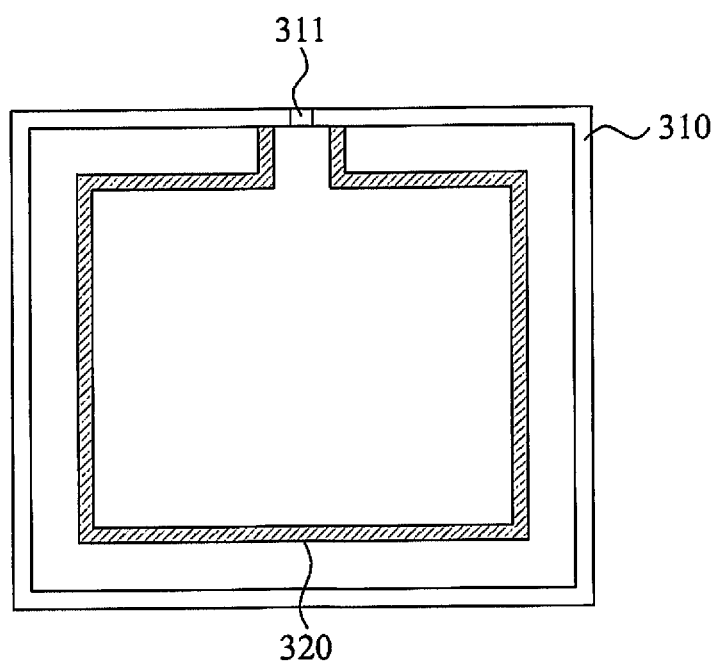
FIGS. 3A and 3B illustrate a resonator and a feeder according to an embodiment of the present invention.
Figure 3B:
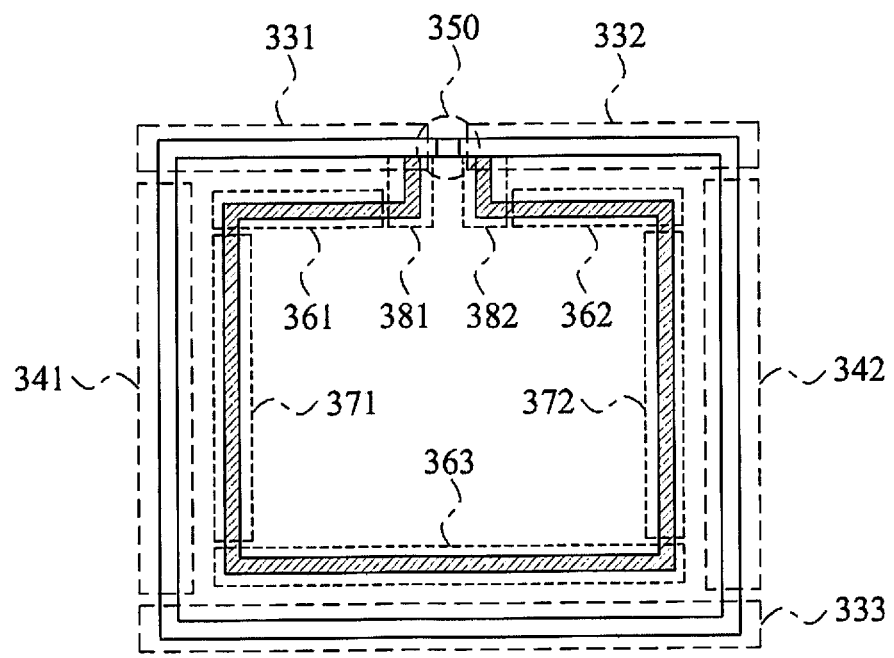

FIGS. 3A and 3B illustrate a resonator and a feeder according to an embodiment of the present invention.

Referring to FIG. 3A, the wireless power transmission apparatus includes a resonator 310, and a feeder 320. The resonator 310 includes a capacitor 311. The feeder 320 is electrically connected to both ends of the capacitor 311.

FIG. 3B illustrates, in more detail, a structure of the wireless power transmission apparatus of FIG. 3A. The resonator 310 in FIG. 3A includes a first transmission line, a first conductor 341, a second conductor 342, and at least one first capacitor 350.

The first capacitor 350 is inserted in series between a first signal conducting portion 331 and a second signal conducting portion 332 in the first transmission line, and an electric field is confined within the first capacitor 350. For example, the first transmission line includes at least one conductor in an upper portion of the first transmission line and at least one conductor in a lower portion of the first transmission line. Current flows through the at least one conductor disposed in the upper portion of the first transmission line. The at least one conductor disposed in the lower portion of the first transmission line may be electrically grounded. For example, a conductor disposed in an upper portion of the first transmission line may be separated into and referred to as the first signal conducting portion 331 and the second signal conducting portion 332. A conductor disposed in a lower portion of the first transmission line may be referred to as a first ground conducting portion 333.

As illustrated in FIG. 3B, the resonator 310 has a generally two-dimensional (2D) structure. The first transmission line includes the first signal conducting portion 331 and the second signal conducting portion 332 in the upper portion of the first transmission line. In addition, the first transmission line includes the first ground conducting portion 333 in the lower portion of the first transmission line. The first signal conducting portion 331 and the second signal conducting portion 332 face the first ground conducting portion 333. Current flows through the first signal conducting portion 331 and the second signal conducting portion 332.

Additionally, one end of the first signal conducting portion 331 is electrically connected (i.e., shorted) to the first conductor 341, and another end of the first signal conducting portion 331 is connected to the first capacitor 350, as illustrated in FIG. 3B. One end of the second signal conducting portion 332 is shorted to the second conductor 342, and another end of the second signal conducting portion 332 is connected to the first capacitor 350. Accordingly, the first signal conducting portion 331, the second signal conducting portion 332, the first ground conducting portion 333, and the conductors 341 and 342 are connected to each other, so that the resonator 310 has an electrically closed-loop structure. The term "loop structure" includes, for example, a polygonal structure such as a circular structure, a rectangular structure, and the like. "Having a loop structure" is a phrase that indicates that a circuit is electrically closed.

The first capacitor 350 is inserted into an intermediate portion of the first transmission line. For example, the first capacitor 350 is inserted into a space between the first signal conducting portion 331 and the second signal conducting portion 332. The first capacitor 350 may be configured as a lumped element, a distributed element, and the like. For example, a capacitor configured as a distributed element may include zigzagged conductor lines and a dielectric material that has a high permittivity positioned between the zigzagged conductor lines.

When the first capacitor 350 is inserted into the first transmission line, the resonator 310 has a characteristic of a metamaterial. "Metamaterial" indicates a material having a predetermined electrical property that has not been discovered in nature, and thus, may have an artificially designed structure. An electromagnetic characteristic of a material existing in nature may have a unique magnetic permeability or a unique permittivity. Most materials have a positive magnetic permeability or a positive permittivity.

In the case of most materials, a right hand rule may be applied to an electric field, a magnetic field, and a pointing vector, and thus, the corresponding materials may be referred to as Right Handed Materials (RHMs). However, a metamaterial that has a magnetic permeability or a permittivity absent in nature may be classified as an Epsilon NeGative (ENG) material, a Mu NeGative (MNG) material, a Double NeGative (DNG) material, a Negative Refractive Index (NRI) material, a Left-Handed (LH) material, and the like, based on a sign of the corresponding permittivity or magnetic permeability.

When a capacitance of the first capacitor 350 inserted as the lumped element is appropriately determined, the resonator 310 has the characteristic of a metamaterial. Because the resonator 310 may have a negative magnetic permeability by appropriately adjusting the capacitance of the first capacitor 350, the resonator 310 may also be referred to as an MNG resonator. Various criteria may be applied to determine the capacitance of the first capacitor 350. For example, the various criteria may include a criterion for enabling the resonator 310 to have the characteristic of a metamaterial, a negative magnetic permeability in a target frequency, a zero-th order resonance characteristic in the target frequency, and the like. Based on at least one criterion among the aforementioned criteria, the capacitance of the first capacitor 350 is determined.

The resonator 310, also referred to as an MNG resonator 310, may have a zero-th order resonance characteristic of having, as a resonance frequency, a frequency when a propagation constant is "0." Because the resonator 310 may have a zero-th order resonance characteristic, the resonance frequency may be independent with respect to a physical size of the MNG resonator 310. By appropriately designing or configuring the first capacitor 350, the MNG resonator 310 may sufficiently change the resonance frequency without changing the physical size of the MNG resonator 310.

In a near field, for instance, the electric field may be concentrated on the first capacitor 350 inserted into the first transmission line. Accordingly, due to the first capacitor 350, the magnetic field may become dominant in the near field. The MNG resonator 310 may have a relatively high Quality argument or Q-argument using the first capacitor 350 of the lumped element, and thus, it may be possible to enhance the efficiency of power transmission. For example, the Q-argument indicates a level of ohmic loss or a ratio of a reactance with respect to a resistance in wireless power transmission. The efficiency of wireless power transmission increases according to an increase in the Q-argument.

A magnetic core may be further provided to pass through the MNG resonator 310. The magnetic core performs a function of increasing a power transmission distance.

Referring to FIG. 3B, the feeder 320 in FIG. 3A includes a second transmission line, a third conductor 371, a fourth conductor 372, a fifth conductor 381, and a sixth conductor 382.

The second transmission line includes a third signal conducting portion 361 and a fourth signal conducting portion 362 in an upper portion of the second transmission line. In addition, the second transmission line includes a second ground conducting portion 363 in a lower portion of the second transmission line. The third signal conducting portion 361 and the fourth signal conducting portion 362 face the second ground conducting portion 363. Current flows through the third signal conducting portion 361 and the fourth signal conducting portion 362.

Additionally, one end of the third signal conducting portion 361 is shorted to the third conductor 371, and the other end of the third signal conducting portion 361 is connected to the fifth conductor 381, as illustrated in FIG. 3B. One end of the fourth signal conducting portion 362 is shorted to the fourth conductor 372, and the other end of the fourth signal conducting portion 362 is connected to the sixth conductor 382. The fifth conductor 381 is connected to the first signal conducting portion 331, and the sixth conductor 382 is connected to the second signal conducting portion 332. The fifth conductor 381 and the sixth conductor 382 are connected in parallel to both ends of the first capacitor 350. In this example, the fifth conductor 381 and the sixth conductor 382 are used as input ports to receive an RF signal as an input.

Accordingly, the third signal conducting portion 361, the fourth signal conducting portion 362, the second ground conducting portion 363, the third conductor 371, the fourth conductor 372, the fifth conductor 381, the sixth conductor 382, and the resonator 310 are connected to each other, so that the resonator 310 and the feeder 320 may have an electrically closed-loop structure. The term "loop structure" includes, for example, a polygonal structure such as a circular structure, a rectangular structure, and the like. When an RF signal is received via the fifth conductor 381 or the sixth conductor 382, input current flows in the feeder 320 and the resonator 310, a magnetic field is formed due to the input current, and a current is induced in the resonator 310 by the formed magnetic field. A direction of the input current flowing in the feeder 320 is the same as a direction of the induced current flowing in the resonator 310 and thus, the strength of the total magnetic field increases in the center of the resonator 310, but decreases outside of the resonator 310.

An input impedance is determined based on an area of a region between the resonator 310 and the feeder 320 and accordingly, a separate matching network used to match the input impedance to an output impedance of a PA may not be required. For example, even when the matching network is used, the input impedance may be determined by adjusting a size of the feeder 320 and thus, a structure of the matching network may be simplified. The simplified structure of the matching network may minimize a matching loss of the matching network.

The second transmission line, the third conductor 371, the fourth conductor 372, the fifth conductor 381, and the sixth conductor 382 form the same structure as the resonator 310. In an example in which the resonator 310 has a loop structure, the feeder 320 may also have a loop structure. In another example in which the resonator 310 has a circular structure, the feeder 320 may also have a circular structure.

Figure 4B:
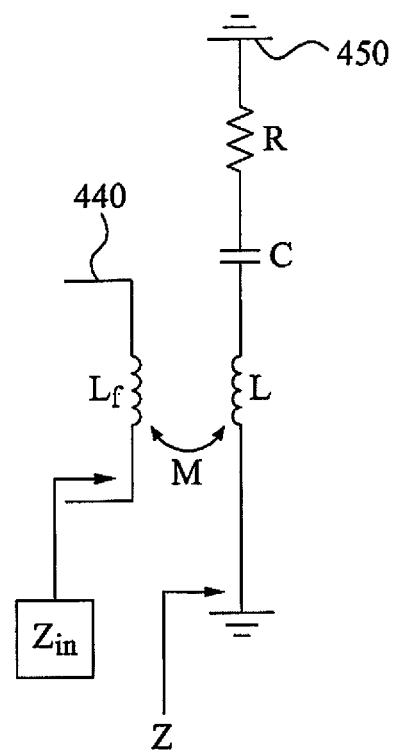

FIGS. 4A and 4B illustrate a distribution of a magnetic field within a resonator based on feeding of a feeder according to an embodiment of the present invention.

A feeding operation refers to supplying power to a source resonator in wireless power transmission, or refers to supplying AC power to a rectifier in wireless power transmission. FIG. 4A illustrates a direction of input current flowing in the feeder, and a direction of induced current induced in the source resonator. Additionally, FIG. 4A illustrates a direction of a magnetic field formed due to the input current of the feeder, and a direction of a magnetic field formed due to the induced current of the source resonator.

Referring to FIG. 4A, the fifth conductor 381 or the sixth conductor 382 of the feeder 320 may be used as an input port 410. The input port 410 receives an RF signal as an input. The RF signal is output from a PA. The PA increases or decreases an amplitude of the RF signal based on a demand by a target device. The RF signal received by the input port 410 is displayed in the form of input current flowing in the feeder. The input current flows in a clockwise direction in the feeder, along a transmission line of the feeder. The fifth conductor of the feeder is electrically connected to the resonator. More specifically, the fifth conductor is connected to a first signal conducting portion of the resonator. Accordingly, the input current flows in the resonator, as well as, in the feeder. The input current flows in a counterclockwise direction in the resonator. The input current flowing in the resonator causes a magnetic field to be formed, so that induced current may be generated in the resonator due to the magnetic field. The induced current flows in a clockwise direction in the resonator. For example, the induced current transfers energy to a capacitor of the resonator, and a magnetic field is formed due to the induced current. In this example, the input current flowing in the feeder and the resonator is indicated by a solid line of FIG. 4A, and the induced current flowing in the resonator is indicated by a dotted line of FIG. 4A.

A direction of a magnetic field formed due to a current may be determined based on the right hand rule. As illustrated in FIG. 4A, within the feeder, a direction 421 of a magnetic field formed due to the input current flowing in the feeder is identical to a direction 423 of a magnetic field formed due to the induced current flowing in the resonator. Accordingly, the strength of the total magnetic field increases within the feeder.

Additionally, in a region between the feeder and the resonator, a direction 433 of a magnetic field formed due to the input current flowing in the feeder has a phase opposite to a phase of a direction 431 of a magnetic field formed due to the induced current flowing in the source resonator, as illustrated in FIG. 4A. Accordingly, the strength of the total magnetic field decreases in the region between the feeder and the resonator.

Typically, a strength of a magnetic field decreases in the center of a resonator with the loop structure, and increases outside the resonator. However, referring to FIG. 4A, the feeder is electrically connected to both ends of a capacitor of the resonator, and accordingly the induced current of the resonator flows in the same direction as the input current of the feeder. Since the induced current of the resonator flows in the same direction as the input current of the feeder, the strength of the total magnetic field increases within the feeder, and decreases outside the feeder. As a result, the strength of the total magnetic field increases in the center of the resonator with the loop structure, and decreases outside the resonator, due to the feeder. Thus, the strength of the total magnetic field is equalized within the resonator.

The power transmission efficiency for transferring power from the resonator to a target resonator is in proportion to the strength of the total magnetic field formed in the resonator. In other words, when the strength of the total magnetic field increases in the center of the resonator, the power transmission efficiency also increases.

Referring to FIG. 4B, the feeder 440 and the resonator 450 are expressed as equivalent circuits. An example of an input impedance $Z_{in}$ viewed in a direction from the feeder 440 to the resonator 450 may be calculated, as indicated in Equation (4) below.

$$Z_{in} = \frac{(\omega M)^2}{Z} \quad (4)$$

In Equation (4) above, M denotes a mutual inductance between the feeder 440 and the resonator 450, ω denotes a resonance frequency between the feeder 440 and the resonator 450, and Z denotes an impedance viewed in a direction from the resonator 450 to a target device.

The input impedance $Z_{in}$ is in proportion to the mutual inductance M. Accordingly, the input impedance $Z_{in}$ is controlled by adjusting the mutual inductance M. The mutual inductance M may be adjusted based on an area of a region between the feeder 440 and the resonator 450. The area of the region between the feeder 440 and the resonator 450 may be adjusted based on a size of the feeder 440. Accordingly, the input impedance $Z_{in}$ may be determined based on the size of the feeder 440, and thus a separate matching network may not be required to perform impedance matching with an output impedance of a PA.

In a target resonator and a feeder that are included in a wireless power reception apparatus, a magnetic field may be distributed as illustrated in FIG. 4A. For example, the target resonator receives wireless power from a source resonator through magnetic coupling. Due to the received wireless power, induced current is generated in the target resonator. A magnetic field formed due to the induced current in the target resonator causes another induced current to be generated in the feeder. In this example, when the target resonator is connected to the feeder as illustrated in FIG. 4A, the induced current generated in the target resonator flows in the same direction as the induced current generated in the feeder. Thus, the strength of the total magnetic field increases within the feeder, but decreases in a region between the feeder and the target resonator.

Figure 5:
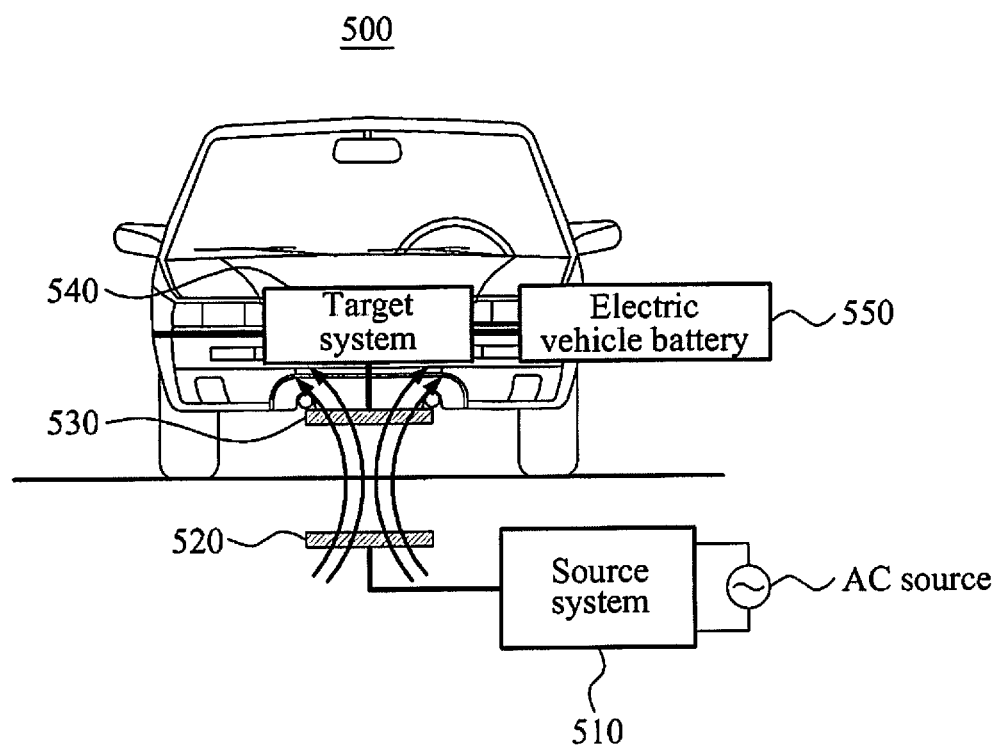
FIG. 5 illustrates an electric vehicle charging system according to an embodiment of the present invention.

FIG. 5 illustrates an example of an electric vehicle charging system according to an embodiment of the present invention.

Referring to FIG. 5, an electric vehicle charging system 500 includes a source system 510, a source resonator 520, a target resonator 530, a target system 540, and an electric vehicle battery 550.

The electric vehicle charging system 500 has a similar structure to the wireless power transmission system of FIG. 1. The source system 510 and the source resonator 520 in the electric vehicle charging system 500 function as a source. Additionally, the target resonator 530 and the target system 540 in the electric vehicle charging system 500 function as a target.

The source system 510 includes a variable SMPS, a PA, a matching network, a TX controller, and a communication unit, similarly to the source 110 of FIG. 1. The target system 540 includes a matching network, a rectifier, a DC/DC converter, a communication unit, and an RX controller, similarly to the target 120 of FIG. 1.

The electric vehicle battery 550 is charged by the target system 540. The electric vehicle charging system 500 uses a resonant frequency in a band of a few kilohertz (KHz) to tens of megahertz (MHz).

The source system 510 generates power, based on a type of charging vehicle, a capacity of a battery, and a charging state of a battery, and supplies the generated power to the target system 540.

The source system 510 controls the source resonator 520 and the target resonator 530 to be aligned. For example, when the source resonator 520 and the target resonator 530 are not aligned, the controller of the source system 510 transmits a message to the target system 540, and controls alignment between the source resonator 520 and the target resonator 530.

For example, when the target resonator 530 is not located in a position enabling maximum magnetic resonance, the source resonator 520 and the target resonator 530 may not be aligned. When a vehicle does not stop accurately, the source system 510 induces a position of the vehicle to be adjusted, and controls the source resonator 520 and the target resonator 530 to be aligned.

The source system 510 and the target system 540 transmit or receive an ID of a vehicle, or exchange various messages, through communication.

The descriptions of FIGS. 1 through 4B apply to the electric vehicle charging system 500. However, the electric vehicle charging system 500 uses a resonant frequency in a band of a few KHz to tens of MHz, and transmits power that is greater than or equal to tens of watts to charge the electric vehicle battery 550.

FIGS. 6A to 7B illustrate applications using a wireless power reception apparatus and a wireless power transmission apparatus according to an embodiment of the present invention.

Figure 6A:
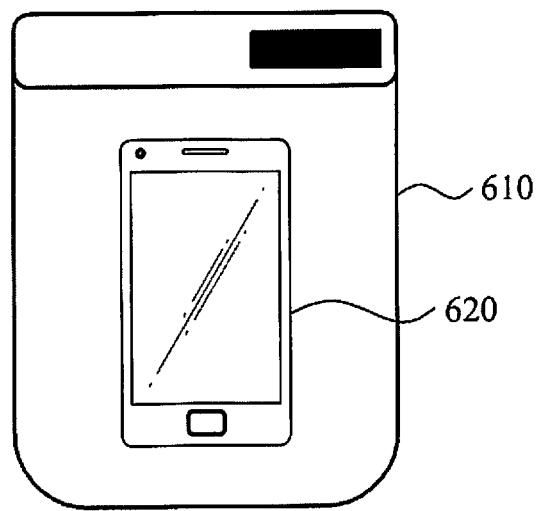
FIGS. 6A to 7B illustrate applications using a wireless power reception apparatus and a wireless power transmission apparatus according to an embodiment of the present invention.
Figure 6B:
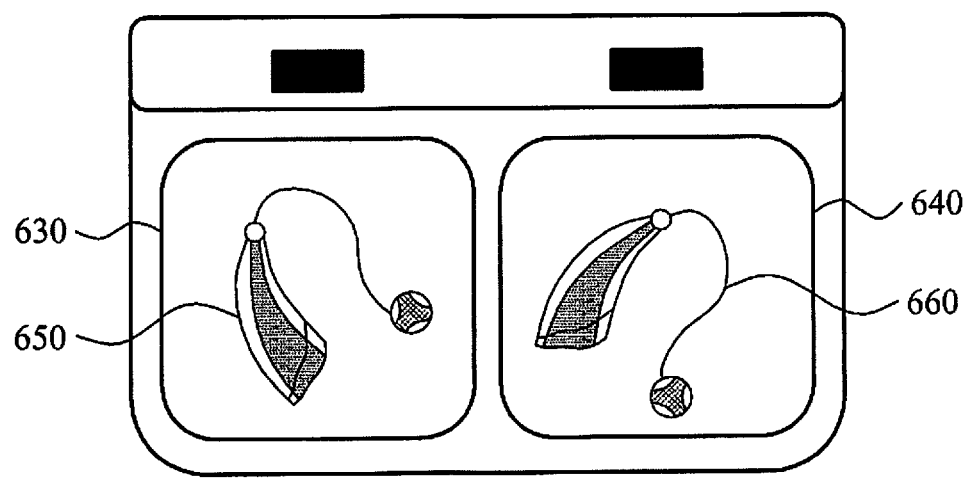

Referring to FIGS. 6A and 6B, FIG. 6A illustrates an example of wireless power charging between a pad 610 and a mobile terminal 620, and FIG. 6B illustrates an example of wireless power charging between pads 630 and 640 and hearing aids 650 and 660.

For example, a wireless power transmission apparatus is mounted in the pad 610, and a wireless power reception apparatus is mounted in the mobile terminal 620. The pad 610 is used to charge a single mobile terminal, namely, the mobile terminal 620.

In another example, two wireless power transmission apparatuses are respectively mounted in the pads 630 and 640. The hearing aids 650 and 660 are used for a left ear and a right ear, respectively. In this example, two wireless power reception apparatuses are respectively mounted in the hearing aids 650 and 660.

Figure 7A:
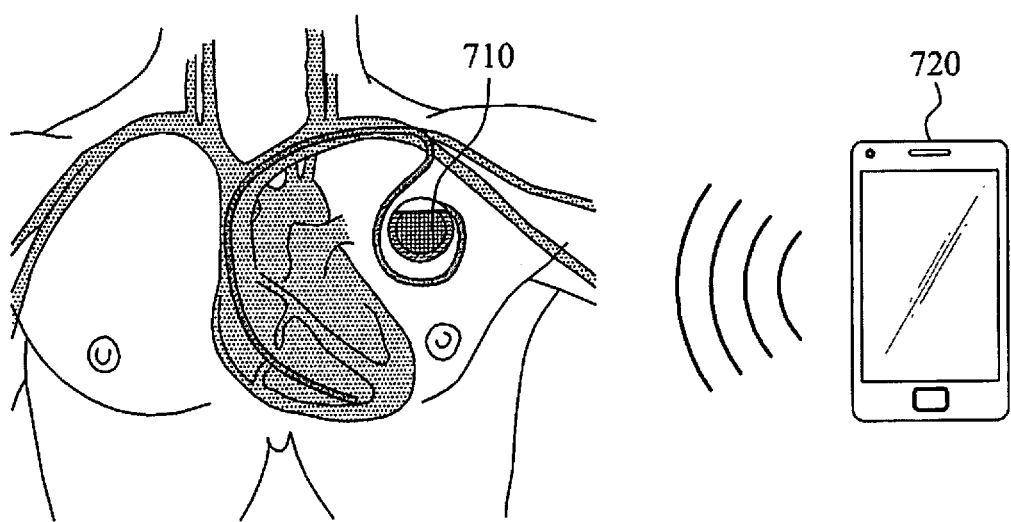
Figure 7B:
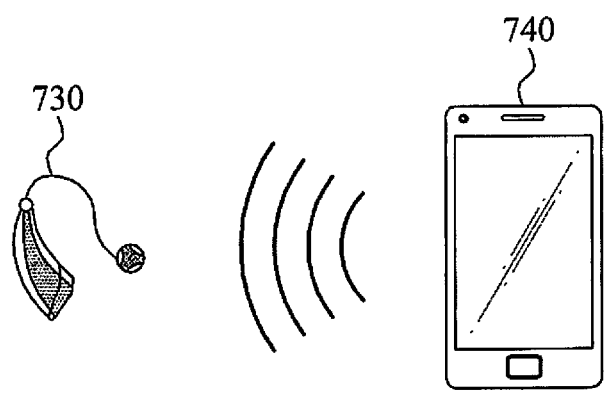

Referring to FIGS. 7A and 7B, FIG. 7A illustrates an example of wireless power charging between an electronic device 710 that is inserted into a human body, and a mobile terminal 720. FIG. 7B illustrates an example of wireless power charging between a hearing aid 730 and a mobile terminal 740.

For example, a wireless power transmission apparatus and a wireless power reception apparatus are mounted in the mobile terminal 720. In this example, the wireless power reception apparatus is mounted in the electronic device 710. The electronic device 710 is charged by receiving power from the mobile terminal 720.

In another example, a wireless power transmission apparatus and a wireless power reception apparatus are mounted in the mobile terminal 740. In this example, the wireless power reception apparatus is mounted in the hearing aid 730. The hearing aid 730 is charged by receiving power from the mobile terminal 740. Low-power electronic devices, such as Bluetooth earphones, may also be charged by receiving power from the mobile terminal 740.

Figure 8:
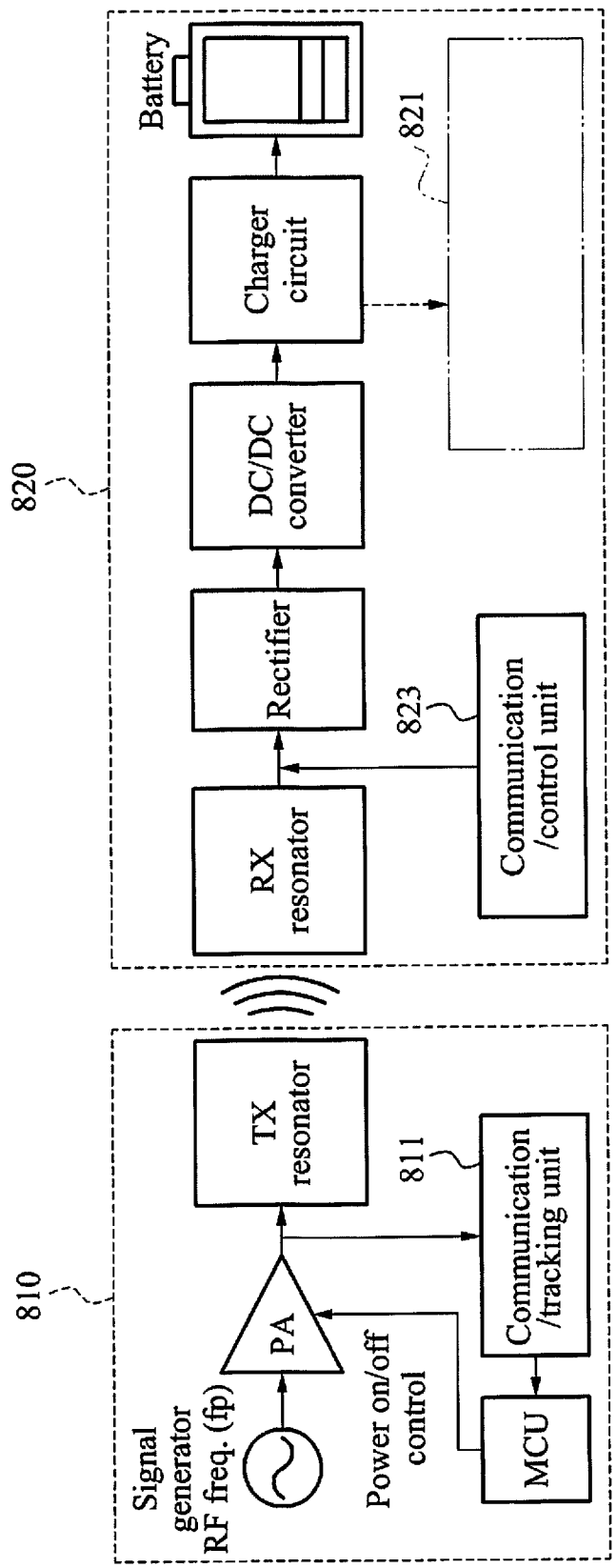
FIG. 8 illustrate a wireless power transmission apparatus and a wireless power reception apparatus according to an embodiment of the present invention.

FIG. 8 illustrates an example of a wireless power transmission apparatus and a wireless power reception apparatus according to an embodiment of the present invention.

For example, a wireless power transmission apparatus 810 of FIG. 8 is mounted in each of the first pad 630 and the second pad 640 of FIG. 6. In another example, the wireless power transmission apparatus 810 is mounted in the mobile terminal 720 of FIG. 7A and/or the mobile terminal 740 of FIG. 7.

Additionally, a wireless power reception apparatus 820 of FIG. 8 is mounted in each of the hearing aids 650 and 660 of FIG. 6.

The wireless power transmission apparatus 810 is configured similarly to the source 110 of FIG. 1. For example, the wireless power transmission apparatus 810 includes a unit configured to transmit power using magnetic coupling.

In FIG. 8, a communication/tracking unit 811 communicates with the wireless power reception apparatus 820, and controls an impedance and a resonant frequency to maintain a wireless power transmission efficiency. For example, the communication/tracking unit 811 performs similar functions to the TX controller 114 and the communication unit 115 of FIG. 1.

The wireless power reception apparatus 820 is configured similarly to the target 120 of FIG. 1. For example, the wireless power reception apparatus 820 includes a unit configured to wirelessly receive power and to charge a battery. As illustrated in FIG. 8, the wireless power reception apparatus 820 includes a target resonator (or an RX resonator), a rectifier, a DC/DC converter, and a charger circuit. Additionally, the wireless power reception apparatus 820 includes a communication/control unit 823.

The communication/control unit 823 communicates with the wireless power transmission apparatus 810, and performs an operation to protect against overvoltage and overcurrent.

Figure 9A:
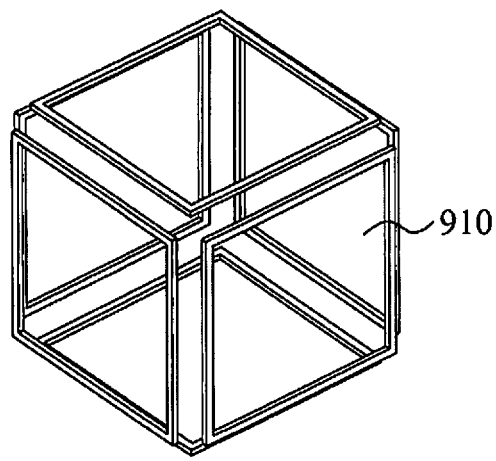
FIGS. 9A and 9B illustrate a stereoscopic flexible resonator, and a field distribution based on a resonance mode of a resonator according to an embodiment of the present invention.
Figure 9B:
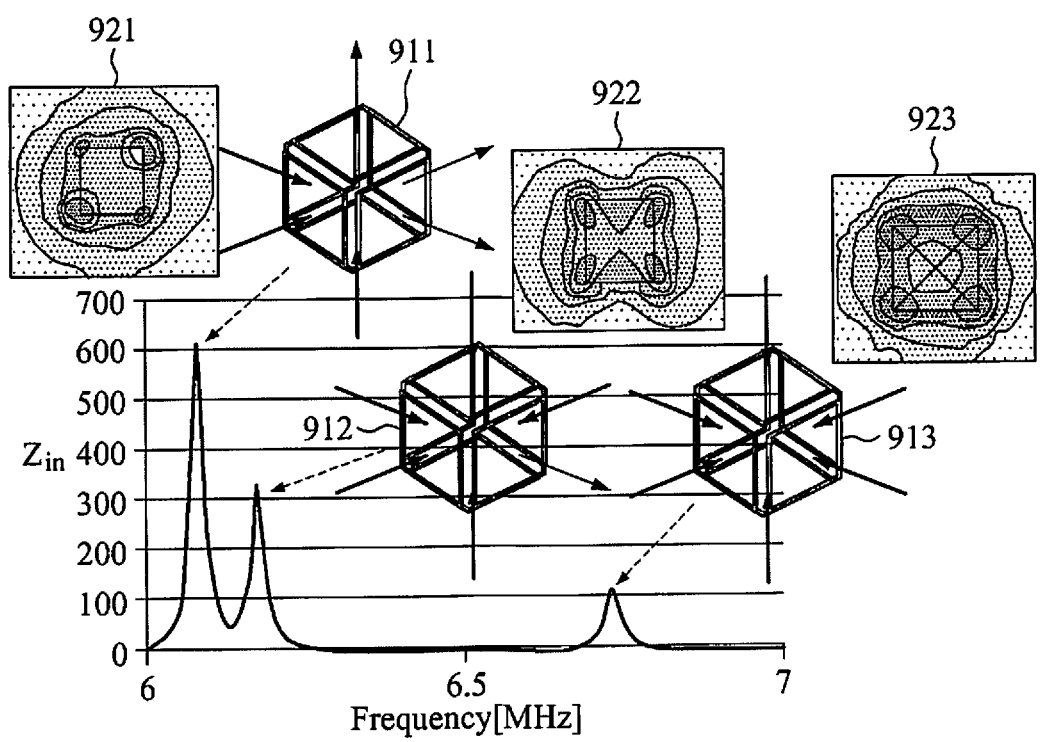

The wireless power reception apparatus 820 includes a hearing device circuit 821. The hearing device circuit 821 is charged by the battery. The hearing device circuit 821 includes a microphone, an Analog-to-Digital Converter (ADC), a processor, a Digital-to-Analog Converter (DAC), and a receiver. For example, the hearing device circuit 821 has the same configuration as a hearing aid. FIGS. 9A and 9B illustrate a stereoscopic flexible resonator 910, and a field distribution based on a resonance mode of a resonator according to an embodiment of the present invention.

Typically, when an RX resonator and a TX resonator face each other, a resonator for wireless power transmission may have its highest transmission efficiency. When an angle of one of the RX resonator and the TX resonator facing each other is changed, the transmission efficiency may be significantly reduced. Accordingly, a characteristic in a transmission direction may be limited. Additionally, considering a practical situation of a mobile device and a medical device, a transmission efficiency of a Printed Circuit Board (PCB) used as a conductor in a device may be significantly reduced, when the PCB is located between the RX resonator and the TX resonator. Accordingly, in wireless charging of a mobile phone, a small electronic device, or a medical device, power transmission efficiency may be reduced based on a location in which a device is placed.

A stereoscopic flexible resonator according to an embodiment of the present invention may maintain a high power transmission efficiency, regardless of a location of a device, and may have a mode to effectively form a magnetic near field suitable for a shape of a transmission and reception apparatus for wireless power transmission. Additionally, the stereoscopic flexible resonator may be used as a source resonator, or a target resonator.

The ideal three Dimensional (3D) stereoscopic flexible resonator 910 of FIG. 9A has a hexahedral structure, and resonators, each having a rectangular shape, have predetermined intervals in x, y, and z directions. Each of the resonators includes a capacitor and an inductor having a shape of a single loop or a multi-loop with an arbitrary shape, an arbitrary size, and an arbitrary thickness. Additionally, each of the resonators may have an arbitrary resonant frequency. In the present invention, the terms "3D resonator," "stereoscopic resonator," and "3D stereoscopic resonator" may be interchangeably used with respect to each other.

Referring to FIG. 9B, an ideal 3D stereoscopic resonator including a plurality of resonators have various resonance modes. In the graph of FIG. 9B, a vertical axis represents an input impedance in ohms ($\Omega$), and a horizontal axis represents a resonant frequency in MHz.

According to an embodiment of the present invention, it is possible to select modes corresponding to a single direction, both directions, and all directions based on a scheme of setting a resonant frequency of a resonator and applying power. Accordingly, it is possible to select an appropriate mode based on a use environment and a shape of a device requiring wireless power transmission.

In FIG. 9B, a resonator 911 set in a first resonance mode shows an H-field distribution 921, and has a resonant frequency corresponding to a first peak point of the input impedance in the graph. A resonator 912 set in a second resonance mode shows an H-field distribution 922 in both directions, and has a resonant frequency corresponding to a second peak point of the input impedance in the graph. In addition, a resonator 913 set in a third resonance mode shows an H-field distribution 923 in all directions, and has a resonant frequency corresponding to a third peak point of the input impedance in the graph.

A resonance mode of a 3D stereoscopic resonator is not limited to the above three resonance modes, and a plurality of resonance modes may be provided based on a scheme of setting a resonant frequency and applying power.

Figure 10A:
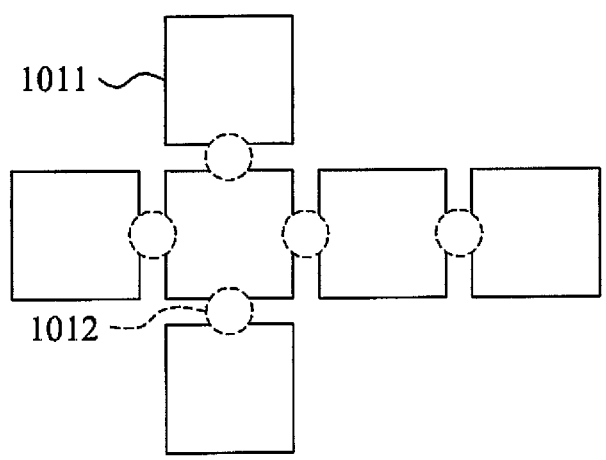
FIGS. 10A and 10B illustrate examples of a structure of a stereoscopic flexible resonator according to an embodiment of the present invention.
Figure 10B:
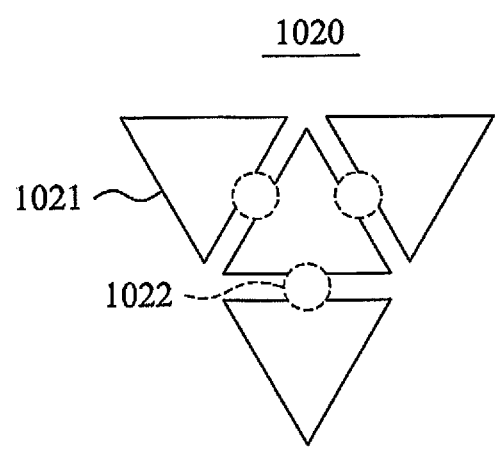

FIGS. 10A and 10B illustrate examples of a structure of a stereoscopic flexible resonator according to an embodiment of the present invention.

A stereoscopic flexible resonator includes a plurality of cells. In a scheme of inducing a current to flow in the cells, the cells are connected in a direct configuration or a cross configuration, or a capacitor may be inserted.

For example, in a stereoscopic flexible resonator 1010, a cell and a resonator 1011, each having a rectangular shape, are connected in a hexahedral structure through a connection unit 1012. The cell includes a connection unit and an inductor having a shape of a single loop or a multi-loop, instead of including a capacitor. A resonator includes an inductor and a capacitor. The cell is connected to the resonator through the connection unit, to form a single 3D stereoscopic resonator. Additionally, a loop shape of each of the cell and the resonator is not limited to a rectangle, and includes all shapes used to form a loop.

In another example, in FIG. 10B, a stereoscopic flexible resonator 1020, a cell and a resonator 1021, each having a triangular shape, are connected in a tetrahedral structure through a connection unit 1022. A loop shape of each of the cell and the resonator is not limited to a triangle, and includes all shapes used to form a loop.

In still another example, in a stereoscopic flexible resonator, a cell and a resonator, each having an arbitrary shape, are connected in a polyhedral structure through a connection unit.

Figure 11A:
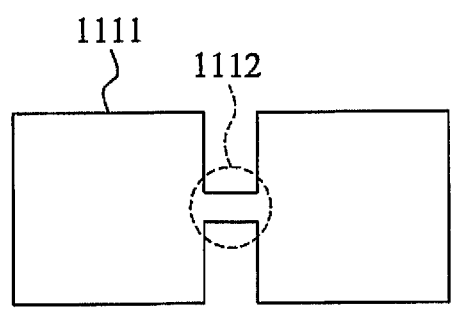
FIGS. 11A to 11C illustrate examples of a connection unit of a stereoscopic flexible resonator according to an embodiment of the present invention.
Figure 11B:
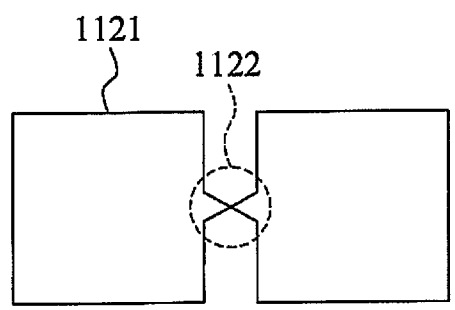
Figure 11C:
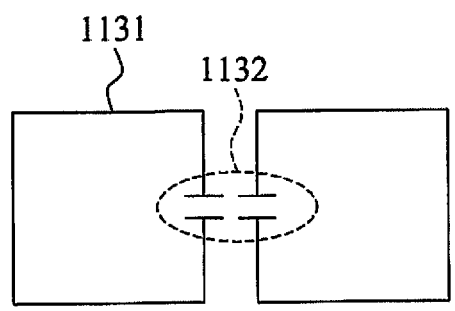

FIGS. 11A to 11C illustrate examples of a connection unit of a stereoscopic flexible resonator according to an embodiment of the present invention. The stereoscopic flexible resonator includes a single cell and a single resonator.

In resonators 1111 connected through a connection unit 1112 having a direct configuration as shown in FIG. 11A, currents flow in the same direction. For example, when a current flows in a left loop in a clockwise direction, a current also flows in a right loop in the clockwise direction.

In resonators 1121 connected through a connection unit 1122 having a cross configuration as shown in FIG. 11B, currents flow in opposite directions. For example, when a current flows in a left loop in a clockwise direction, a current flows in a right loop in a counterclockwise direction.

Resonators 1131 are connected through a connection unit 1132 having a shape of a capacitor as shown in FIG. 11C. Loops of the resonators are coupled by capacitors, and a direction and magnitude of a current is changed based on a capacitance of each of the capacitors.

Figure 12A:
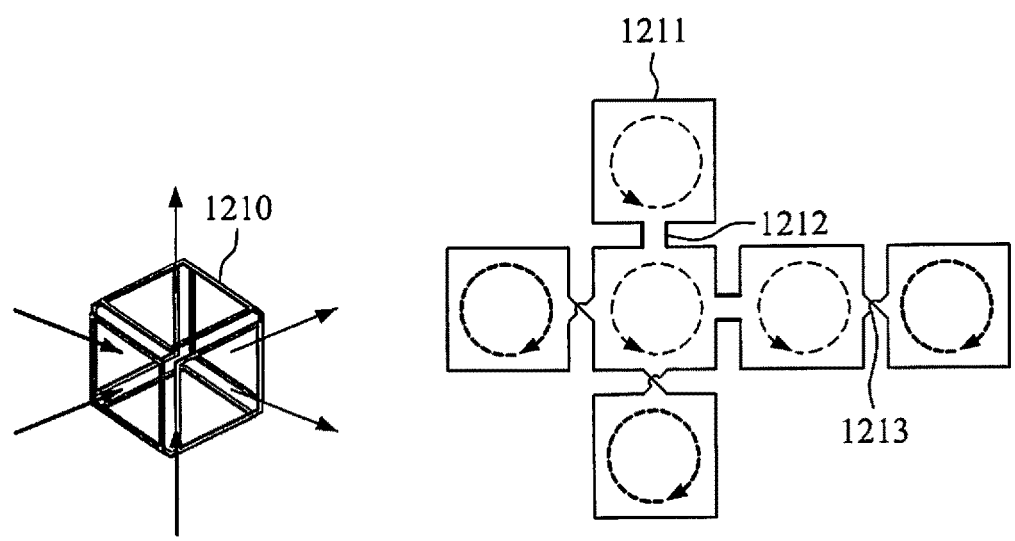
FIGS. 12A and 12B illustrate examples of a resonance mode based on a selection of a connection unit of a stereoscopic flexible resonator according to an embodiment of the present invention.
Figure 12B:
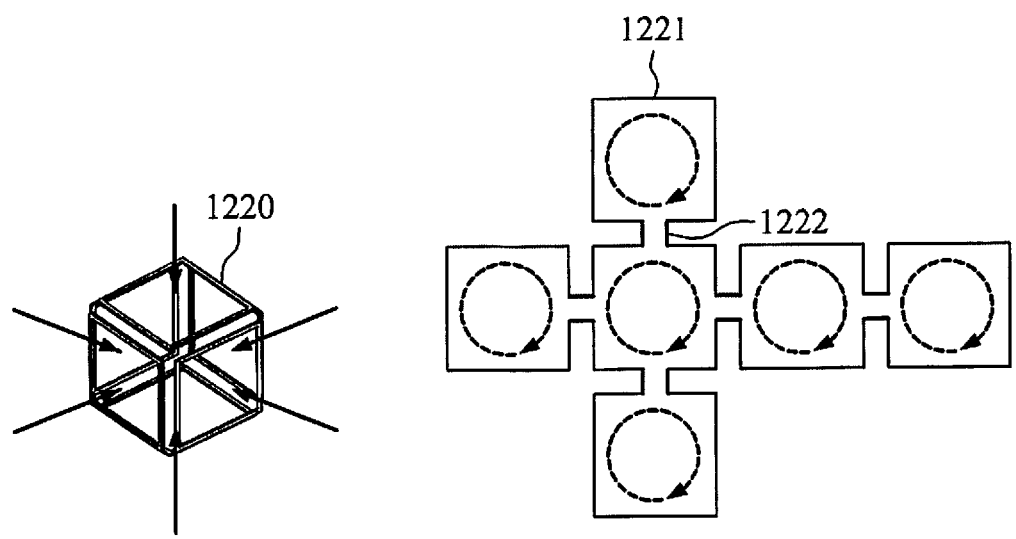

FIGS. 12A and 12B illustrate examples of a resonance mode based on a selection of a connection unit of a stereoscopic flexible resonator according to an embodiment of the present invention.

A connection unit having a direct configuration or a cross configuration induces a current to flow in the same direction as or an opposite direction to a direction of a current flowing in a neighboring cell. Accordingly, by selecting a type of connection units as shown in FIGS. 12A and 12B, a field of a 3D stereoscopic resonator is selected. Similarly, when a capacitor is inserted into a cell and the cell is used as a resonator having an arbitrary resonant frequency, a direction and an intensity of a current is adjusted based on a scheme of selecting a resonant frequency. In other words, by changing a capacitance of the capacitor, a mode of a magnetic near field is changed suitably for a shape of a device. A resonance direction of a resonance mode is determined by a direction of a current flowing in each of a cell and a resonator, based on a right-handed screw rule.

In a stereoscopic flexible resonator 1210 of FIG. 12A, cells and resonators 1211 are connected in a hexahedral structure via a connection unit 1212 having a direction configuration and a connection unit 1213 having a cross configuration. The stereoscopic flexible resonator 1210 is set in the same resonance mode as the resonance mode of the stereoscopic resonator 911 of FIG. 9. Accordingly, when the right-handed screw rule is applied to directions of currents flowing in cells and resonators, a resonance direction corresponds to a single direction.

In a stereoscopic flexible resonator 1220 of FIG. 12B, cells and resonators 1221 is connected in a hexahedral structure via connection units 1222, each having a direction configuration. The stereoscopic flexible resonator 1220 is set in the same resonance mode as the resonance mode the stereoscopic resonator 913 of FIG. 9. When the right-handed screw rule is applied to directions of currents flowing in cells and resonators, a resonance direction corresponds to all directions.

Although a few embodiments have been shown and described, the present invention is not limited to the described embodiments. Instead, it will be apparent to those skilled in the art that various modifications and variations can be made to these embodiments without departing from the scope and spirit of the invention.

Thus, the scope of the present disclosure is not limited to the above-described embodiments, but is defined by the appended claims and their equivalents.

What is claimed is:

1. A wireless power transmitter for wirelessly transmitting power, the wireless power transmitter comprising:
    four cells configured to wirelessly transmit power to a wireless power receiver;
    a power source configured to provide power to one of the four cells; and
    a connection unit configured to connect the four cells to each other,
    wherein the connection unit is further configured to connect the four cells in a cross configuration.

2. The wireless power transmitter of claim 1, wherein:
    a first cell is disposed perpendicular to a second cell and connected to the second cell in a cross configuration;
    the first cell is further disposed perpendicular to a third cell and connected to the third cell in a cross configuration;
    a fourth cell is disposed perpendicular to the second cell and connected to the second cell in a cross configuration;
    the fourth cell is further disposed perpendicular to the third cell and connected to the third cell in a cross configuration;
    the first cell and the fourth cell are spaced apart by a first distance and are parallel to each other; and
    the second cell and the third cell are spaced apart by a second distance and are parallel to each other.

* * * * *